United States Patent
Visser

(10) Patent No.: US 7,549,333 B1
(45) Date of Patent: Jun. 23, 2009

(54) FLUID LEVEL SENDER ASSEMBLY AND METHOD OF MAKING A FLUID LEVEL SENDER ASSEMBLY

(75) Inventor: Piet Visser, Walker, MI (US)

(73) Assignee: Medallion Instrumentation Systems LLC, Spring Lake, MI (US)

( * ) Notice: Subject to any disclaimer, the term of this patent is extended or adjusted under 35 U.S.C. 154(b) by 3 days.

(21) Appl. No.: 11/961,405

(22) Filed: Dec. 20, 2007

(51) Int. Cl.
*G01F 23/00* (2006.01)
(52) U.S. Cl. ............................................. 73/313
(58) Field of Classification Search ............... 73/313, 73/866.5
See application file for complete search history.

(56) References Cited

U.S. PATENT DOCUMENTS

| | | | |
|---|---|---|---|
| 1,458,338 A * | 6/1923 | Grimshaw et al. ............ | 73/313 |
| 2,423,875 A * | 7/1947 | Curtis et al. ............. | 73/290 R |
| 3,200,646 A | 8/1965 | Donko et al. | |
| 4,184,370 A | 1/1980 | Schlick et al. | |
| 4,671,121 A | 6/1987 | Schieler | |
| 4,928,526 A | 5/1990 | Weaver | |
| 5,152,170 A | 10/1992 | Liu | |
| 5,216,919 A | 6/1993 | Nelson et al. | |
| 5,406,838 A | 4/1995 | Miller | |
| 6,089,086 A | 7/2000 | Swindler et al. | |
| 6,289,728 B1 * | 9/2001 | Wilkins ....................... | 73/149 |
| 6,851,315 B2 | 2/2005 | Bergsma et al. | |
| 6,923,057 B2 | 8/2005 | Sabatino | |
| 6,968,739 B1 | 11/2005 | Baron et al. | |
| 2007/0125344 A1 * | 6/2007 | Troxler et al. ............... | 123/509 |

\* cited by examiner

*Primary Examiner*—Hezron Williams
*Assistant Examiner*—Rodney T Frank
(74) *Attorney, Agent, or Firm*—Brooks Kushman P.C.

(57) ABSTRACT

A fluid level sender mount assembly includes a first mounting member having a chamber and a second mounting member having an elongate docking portion. The docking portion may be sized to slidably fit and rotate within the chamber to permit positioning the second mounting member at a plurality of different linear and angular positions with respect to the first mounting member. The second mounting member may be affixed to the first mounting member to retain the second mounting member in a desired position W/R/T the first mounting member. One of the first and second mounting members may be adapted to be attached to a fluid container. The other of the first and the second mounting members may be adapted to be attached to a fluid level sender.

20 Claims, 5 Drawing Sheets

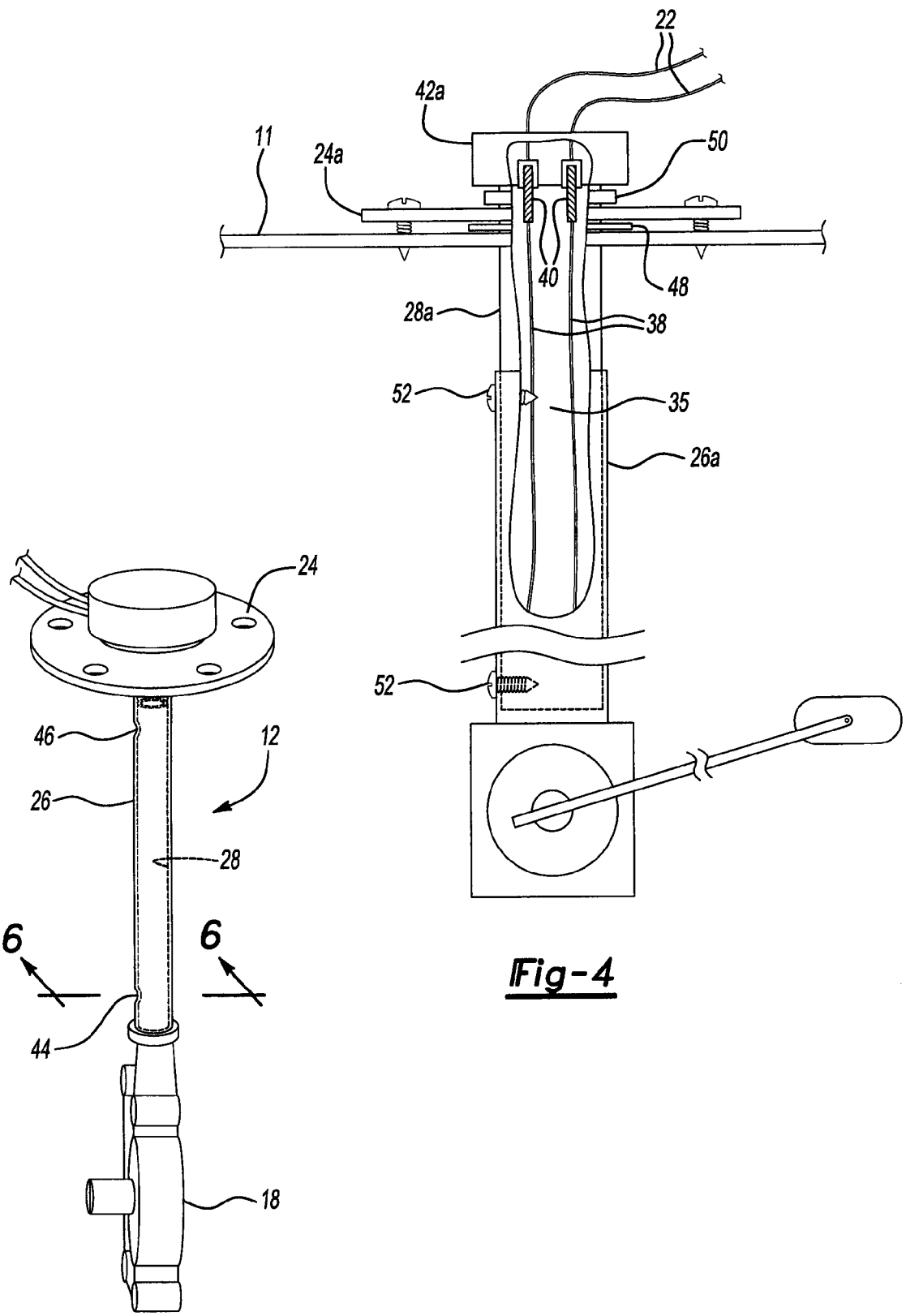

FLUID LEVEL SENDER ASSEMBLY AND METHOD OF MAKING A FLUID LEVEL SENDER ASSEMBLY

BACKGROUND OF THE INVENTION

1. Field of the Invention

The invention described herein relates to the field of mount assemblies for fluid level senders and methods of making mount assemblies for fluid level senders.

2. Background Art

Fluid level sensors or senders measure fluid levels inside of a fluid tank. A fluid level sender may be mounted on a mount assembly projecting into an interior portion of the fluid tank and may include a flotation device connected to a main body by a rod which pivots with respect to the main body. The mount assembly holds the main body in a position that permits the rod and the floatation device to pivot up and down freely without interference from the walls or other structures of the tank as the fluid level changes. The main body is mounted in a non-movable position and the fluid level sender determines the fluid level based on the angular orientation of the rod with respect to the main body.

The size and shape of fluid tanks vary depending upon their application. Designing, manufacturing and producing different mounts for each different application can be expensive. It is desirable to have a fluid level sender that is mounted on a mount assembly which can be tailored to the dimensions of each specific fluid tank. This invention addresses this and other problems.

SUMMARY OF THE INVENTION

In a first aspect of the invention, an apparatus is provided. In at least a first embodiment of the apparatus, a fluid level sender mount assembly for mounting a fluid level sender to a fluid container is disclosed. The assembly comprises a first mounting member that has a chamber with a generally circular cross section. The generally circular cross section has a substantially constant diameter along a length of the chamber. A second mounting member has an elongate docking portion that has an at least partially circular cross section. The generally circular cross section has a substantially constant diameter along a length of the docking portion. The docking portion is sized to slidably fit and rotate within the chamber to permit the second mounting member to be positioned at a plurality of different linear and angular positions with respect to the first mounting member. The docking portion is disposed within the chamber and the second mounting member may be positioned at a desired linear and angular position with respect to the first mounting member. The second mounting member is then affixed to the first mounting member to inhibit relative movement of the first and the second mounting members from the desired linear and angular position. One of the first and the second mounting members may be adapted to be attached to the fluid container such that a portion of each of the first and the second mounting members projects into the fluid container. The other of the first and the second mounting members may be adapted to be attached to the fluid level sender.

In at least one implementation of the first embodiment, the fluid level sender comprises a wire assembly. The chamber is a first chamber that extends through the first mounting member, and the second mounting member has a second chamber. The second chamber may be contiguous with the first chamber to form a tunnel to receive the wire assembly. In at least one variation of this implementation, the second mounting member may be adapted to be attached to the fluid level sender. An end of the wire assembly may include an electrical terminal, and the first mounting member may include an electrical connector to receive the electrical terminal and to transmit an electrical signal from the fluid level sender to a receiver positioned outside of the fluid tank.

In another variation, the first mounting member may be adapted to be attached to the fluid level sender. An end of the wire assembly may include an electrical terminal, and the second mounting member may include an electrical connector to receive the electrical terminal and to transmit an electrical signal transmitted by the fluid level sender to a receiver positioned outside of the fluid tank.

In another variation, the fluid level sender mount assembly may further comprise a mounting plate. The first mounting member may have a first end and a second and the docking portion may be docked with the first end. The mounting plate may be attached to the first mounting member proximate the second end and the mounting plate may be adapted to connect the first mounting member to the fluid tank. The mounting plate may be further configured to permit the wire assembly to pass through the mounting plate. Alternatively, the mounting plate may be attached to the second mounting member at a position spaced apart from the docking portion. The mounting plate may be configured to connect the second mounting member to the fluid tank and to permit the wire assembly to pass through the mounting plate.

In at least another implementation of the first embodiment, the second mounting member may be affixed to the first mounting member by one of a threaded fastener and a crimp.

In another implementation of the first embodiment, the fluid level sender mount assembly may further comprise a fastener that connects the second mounting member to the first mounting member.

In a second embodiment, a fluid level sender assembly is disclosed. The assembly includes a first mounting member having a first chamber having a generally circular cross section. The generally circular cross section has a substantially constant diameter along a substantial length of the chamber. A second mounting member is provided. The second mounting member includes a docking portion that has a generally cylindrical shape and a generally circular cross section. The second mounting member further includes a second chamber that extends through the docking portion. The docking portion is configured to slide telescopically and rotate within the first chamber to allow the second mounting member to be positioned at a plurality of linear and angular positions with respect to the first mounting member. The docking portion is disposed within the first chamber and the second mounting member may be positioned at a desired linear and angular position with respect to the first mounting member. The second mounting member is then affixed to the first mounting member such that the second mounting member is inhibited from moving with respect to the first mounting member out of the desired angular and linear position. A fluid level sender sub-assembly may be attached to one of the first and the second mounting members. The other of the first and the second mounting members may be adapted for attachment to a fluid tank such that a portion of each of the first and the second mounting members and the fluid level sender sub-assembly are disposed inside of the fluid tank.

In at least one implementation of the second embodiment, the fluid level sender sub-assembly may be integral with one of the first and second mounting members.

In at least another implementation of the second embodiment, the fluid level sender may include a wire assembly. The first and the second chambers may form a tunnel to receive at least a portion of the wire assembly. In at least one variation of this implementation, the fluid level sender may be attached to the second mounting member. An end of the wire assembly may include an electrical terminal, and the first mounting member may include a socket to receive the electrical terminal and to transmit an electrical signal from the fluid level sender to a receiver disposed outside of the fluid container. In at least another variation of this implementation, the fluid level sender may be attached to the second mounting member, and the first mounting member may include a plate disposed at an end of the first mounting member that is opposite an end attached to the second mounting member. The plate may be configured to connect the first mounting member to the fluid tank and may be further configured to permit the wire assembly to extend through the plate.

In at least another implementation of the second embodiment, the second mounting member and the first mounting member may be attached to one another by a crimp.

In at least another implementation of the second embodiment, the fluid level sender may further comprise a fastener that affixes the second mounting member to the first mounting member.

In another aspect of the invention, a method of assembling a fluid level sender assembly is provided. The fluid level sender assembled by the method may have having a first support member having first and second ends and a first chamber extending therebetween, a second support member having first and second ends and a second chamber extending therebetween. The second support member may be configured for telescopic connection to the first support member and may be further configured to rotate with respect to the first support member. A fluid level sender may be attached to the second support member. In a third embodiment, the method of assembling the fluid lever send assembly may comprise telescopically connecting the first end of the second support member to the first end of the first support member. The axial position of the second support member with respect to the first support member may be adjusted until the fluid level sender is a desired distance from the second end of the first support member. The first support member may be rotated with respect to the second support member until the fluid level sender is at a desired angular orientation with respect to the first support member. The second support member may be affixed to the first support member to inhibit further axial and angular movement of the second support member with respect to the first support member.

In at least one implementation of the third embodiment, the second support member may be affixed to the first support member by crimping.

In at least another implementation of the third embodiment, the method may further comprise cutting the first support member to a desired length.

In another implementation of the third embodiment, the method may further comprise determining the desired distance between the fluid level sender and the first end of the support member based on internal dimensions of a fluid tank that is to be fitted with the fluid level sender assembly and determining the desired angular orientation of the fluid level sender with respect to the first support member based on the internal dimensions of the fluid tank.

In at least another implementation of the third embodiment, the first support member may further have a plate attached proximate the second end of the first support member. The plate may be configured for attachment to a fluid tank and may have a socket facing the first chamber. The fluid level sender may have a wire assembly having an electrical connector. The method may further comprise inserting the wire assembly through the first and the second chambers and inserting the electrical connector into the socket.

BRIEF DESCRIPTION OF THE DRAWINGS

FIG. 3 is a perspective view of the fluid level sender assembly of FIG. 2A after the components have been affixed to one another in a nested configuration;

FIG. 4 is a cutaway, fragmented side elevational view of a second embodiment of a fluid level sender assembly;

DETAILED DESCRIPTION OF THE PREFERRED EMBODIMENT(S)

The present invention relates to a universally configurable mount for a fluid level sender. Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
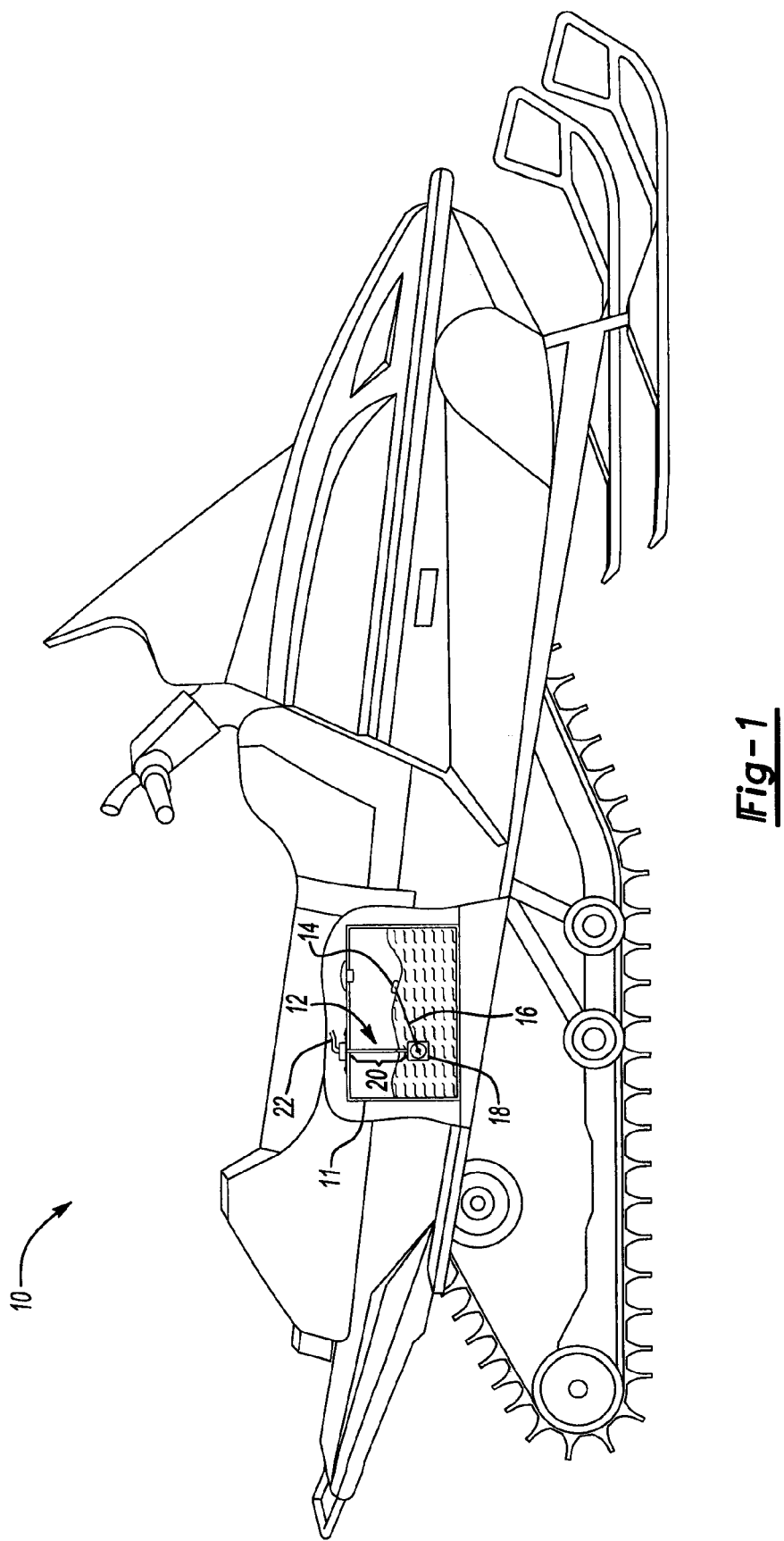
FIG. 1 is an environmental, cutaway view illustrating a vehicle equipped with an embodiment of the fluid level sender assembly of the present invention.

FIGS. 1-3 illustrate a first embodiment of a fluid level sender assembly 12. FIG. 1 illustrates a vehicle 10 equipped with an embodiment of a fluid level sender assembly 12 made in accordance with the teachings of the present invention. While vehicle 10 is depicted as a snowmobile, it should be understood to those of ordinary skill in the art that fluid level sender assembly 12 may be mounted on vehicles of all types including other types of land craft, water craft, aircraft and spacecraft. Fluid level sender assembly 12 is depicted in FIG. 1 as measuring the fuel level in a fuel tank 11. It should be understood by those of ordinary skill in the art that fluid level sender assembly 12 is not limited to measuring fuel levels but may also be used in any application where it is necessary to determine and report the fluid level in a fluid container.

Fluid level sender assembly 12 includes a flotation device 14, a rod 16, a fluid level sender sub-assembly 18 and a fluid level sender mount assembly 20. Flotation device 14 floats on the surface of the fluid. As fluid level rises or falls, so does flotation device 14. Rod 16 connects flotation device 14 to fluid level sender sub-assembly 18. The angular orientation of rod 16 changes as flotation device 14 rises and falls. Fluid level sender sub-assembly 18 measures the angular orientation of rod 16 to determine the level of the fluid within a container. The fluid level sender sub-assembly 18 transmits the fluid level to a read-out device (not shown) such as a video screen or a gage. A wire assembly 22 connects fluid level sender 12 to the read-out device. In other embodiments, the fluid level could be transmitted through RF or infra red transmissions. The fluid level sender sub-assembly 18 is disposed within fluid tank 11 in a substantially unmoveable position having a known distance from a bottom portion of fluid tank 11 to enable calculation of the fluid level. The fluid level sender sub-assembly 18 is held in place by a fluid level sender mount assembly 20.

Figure 2A:
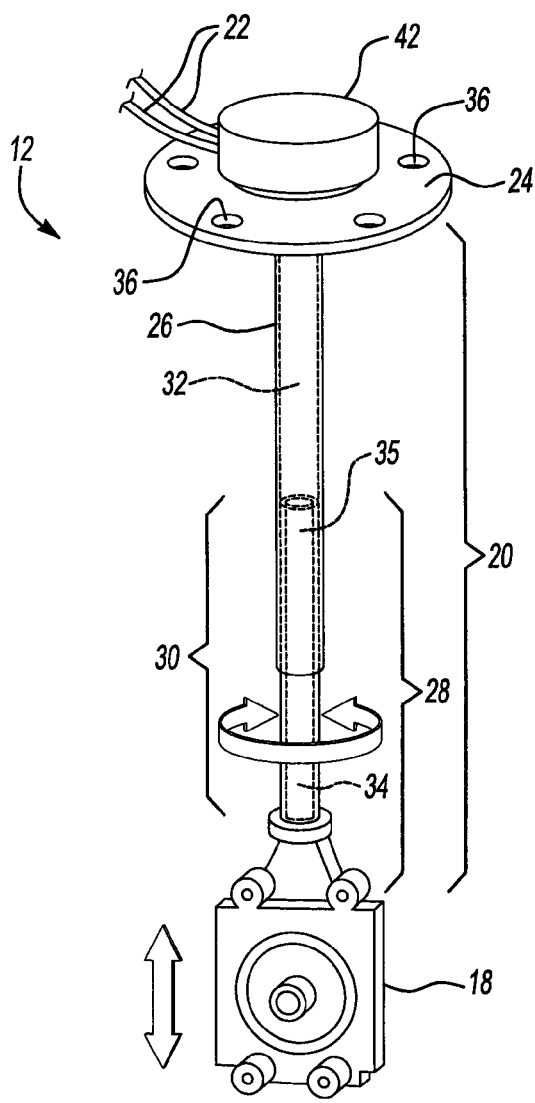
FIG. 2A is a perspective view of a portion of the fluid level sender assembly of FIG. 1 wherein some of the components are free to slide and rotate with respect to each other.

FIG. 2A is an expanded view of the fluid level sender assembly 12, illustrated without flotation device 14 or rod 16. Fluid level sender mount assembly 20 includes a mounting plate 24, a first mounting member 26 and a second mounting member 28. Mounting plate 24 is attached to first mounting member 26 and may be attached by any means effective to rigidly attach the two components including welding or brazing to provide a robust attachment. Second mounting member 28 includes a docking portion 30. The first mounting member 26 has a first chamber 32 and second mounting member 28 has a second chamber 34. The two chambers form a tunnel 35 through the fluid level sender assembly 12. First chamber 32 and docking portion 30 each have a generally cylindrical shape and are sized to fit telescopically together. As indicated by arrows, docking portion 30 is configured to slide in and out of first chamber 32. This allows a person assembling the fluid level sender assembly 12 to adjust its over all length to a desired dimension. Additionally, docking portion 30 can rotate within the first chamber allowing the user to adjust the angle of fluid level sender sub-assembly 18 with respect to first mounting member 26 (and mounting plate 24) to a desired orientation. The lateral and angular adjustability of second mounting member 28 with respect to first mounting member 26 permits the construction of fluid level sender assemblies that are dimensionally tailored and configured to operate within a fluid tank free from obstruction of the sides of the tank.

Mounting plate 24 includes a plurality of fastener apertures 36 which correspond to apertures in the fluid tank. In the illustrated embodiment, there are five fastener apertures 36. If docking portion 30 were unable to rotate, then the fluid level sender sub-assembly 18 would be limited to only five angular orientations with respect to the tank. Because docking portion 30 is configured to rotate, fluid level sender sub-assembly 18 may be oriented in an infinite number of angular orientations with respect to fluid tank 11. Likewise, docking portion 30's ability to telescopically slide with respect to first mounting member 26 allows an assembler to extend fluid level sender sub-assembly 18 to an infinite number of axial positions.

Fluid level sender sub-assembly 18 includes a wire assembly 38 (see FIG. 4) which transmits an electric signal from the fluid level sender sub-assembly 18 to a receiver disposed outside of the fluid tank 11. Wire assembly 38 includes electric terminals 40 (see FIG. 4). The fluid level sender assembly of FIGS. 2A-3 includes an electrical connector or socket 42 to receive electric terminals 40. A wire assembly 22 electrically connects fluid level sender assembly 12 to the receiver (not shown). In at least some embodiments, first mounting member 26 or second mounting member 28 may be made of a substantially non-electrically conductive material to electrically insulate fluid level sender sub-assembly 18. In still other embodiments, both first mounting member 26 and second mounting member 28 may be made of a substantially non-electrically conductive material.

Figure 2B:
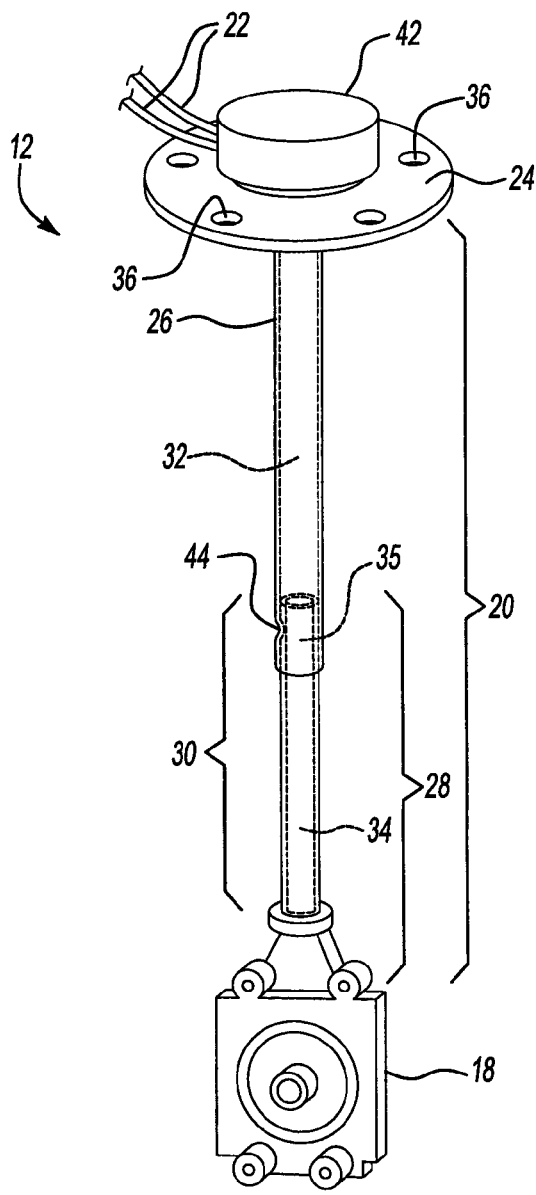
FIG. 2B is a perspective view of the fluid level sender assembly shown in FIG. 2A after the components have been affixed to one another in an extended configuration.

Once the components of fluid level sender assembly 12 have been extended to a desired length and once a desired angular orientation of the fluid level sender sub-assembly 18 has been set, the first and second mounting members 26, 28 are fixed with respect to one another by first crimp 44 (see FIG. 2B). In the illustrated embodiment, the first crimp 44 is a dimple crimp. However, it should be understood by those of ordinary skill in the art that a crimp of any shape may be employed to affix first and second mounting members 26, 28. First crimp 24 deforms the material comprising first mounting member 26 forcing it into a tight interference fit with a portion of docking portion 30 with the result that first and second mounting members 26, 28 are no longer free to rotate or slide with respect to one another. This permits fluid level sender sub-assembly 18 to remain in a desired position and to resist movement from that position during the operational life of the fluid tank.

In FIG. 2A, docking portion 30 is partially inserted within the first chamber 32 and first mounting member 26 has not been crimped. Docking portion 30 is free to slide and rotate with respect to first mounting member 26. In FIG. 2B, crimp 44 has been made in first mounting member 26, affixing it to docking portion 30 of second mounting member 28. The fluid level sender assembly 12 shown in FIG. 2B illustrates a nearly fully extended arrangement of first and second mounting members 26, 28 for use with a relatively deep fluid tank 11.

In FIG. 3, docking portion 30 is fully inserted or nested within first chamber 32. The overall length of fluid level sender assembly 12 is substantially less than that of the assembly illustrated in FIG. 2B. This allows fluid level sender assembly 12 to be mounted to fluid tanks having a relatively shallow depth. For fluid tanks of even shallower depth, mounting member 26 or mounting member 28 or both may be cut to shorten their length. A second crimp 46 is disposed proximate the mounting plate 24. Second crimp 46 strengthens the connection between the first and second mounting members 26, 28. Any excess length of wire assembly 38 may be inserted and retained within tunnel 35. In operation, the first and second mounting member 26, 28 are fixed to each other and therefor wire assembly 38 does not experience any motion or bending related fatigue over the life of the fluid level sender assembly 12.

A second embodiment of fluid level sender assembly 12 is illustrated in FIG. 4. Parts of the second embodiment of the fluid level sender assembly 12 that are similar or identical in function to corresponding parts of the first embodiment of fluid level sender assembly 12 illustrated in FIGS. 1-3 are given the same reference numerals with the suffix "a" attached. In the second embodiment, second mounting member 28a is attached to fluid tank 11 through a connection with mounting plate 24a. First mounting member 26a is attached to the fluid level sender sub-assembly 18. To provide a fluid tight fit between mounting plate 24a and fluid tank 11, a first gasket 48 may be inserted between mounting plate 24a and fluid tank 11. To provide a fluid tight fit between socket 42a and mounting plate 24a, a second gasket 50 may be employed. In other embodiments, any other apparatus may be utilized to make the contact points between the socket 42a, the mounting plate 24a and the fluid tank 11 fluid-tight, such as O-rings or putty. The second embodiment of fluid level sender assembly 12 uses fasteners 52 to affix the first and second mounting members 26, 28 rather than crimps. Other methods or mechanisms for fixing the first and second mounting members 26, 28, such as braising and welding may also be employed.

Figure 5:
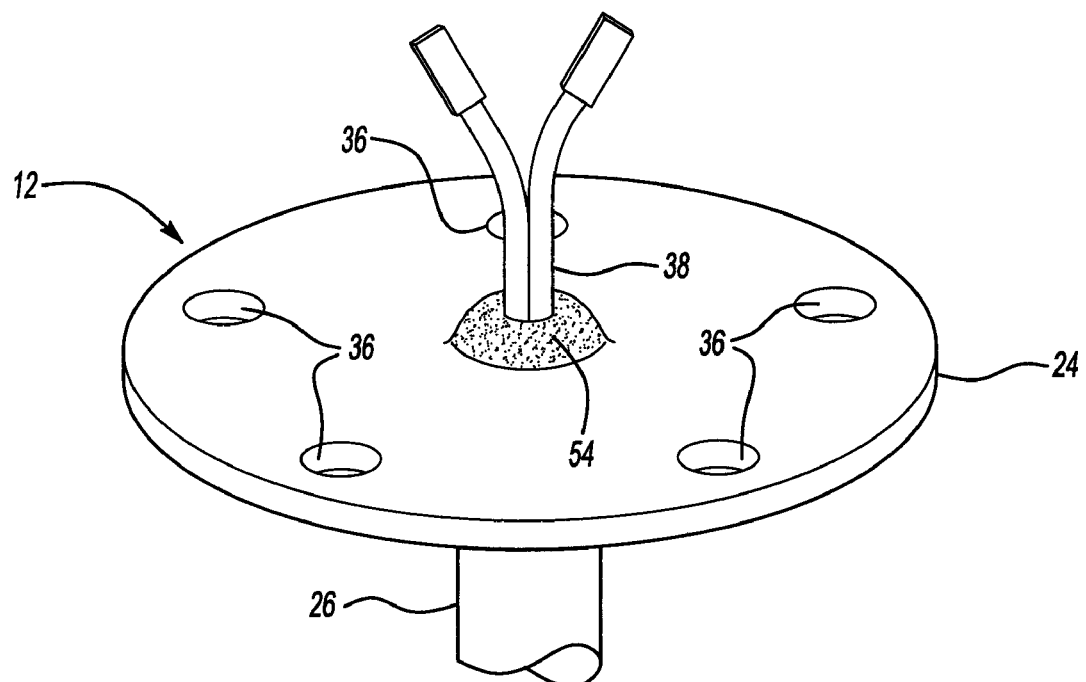
FIG. 5 is a perspective, fragmented view of an embodiment of a mounting plate and a wire assembly.

FIG. 5 illustrates a fragmented view of a third embodiment of fluid level sender assembly 12. In this third embodiment, wire assembly 38 protrudes through an aperture in mounting plate 24 and a water proofing substance 54, such as putty or caulk is utilized to keep a fluid tight seal around wire assembly 38.

Figure 6:
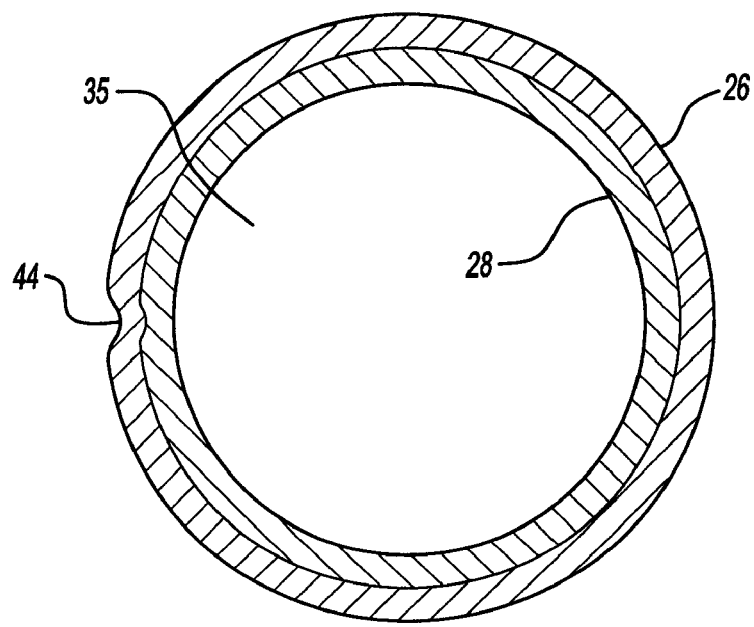
FIG. 6 is a cross-sectional view taken across the line 6-6 of FIG. 3.

FIG. 6 illustrates a cross section taken along the line 6-6 in FIG. 3. In this view, the impingement of the crimped portion first mounting member 26 on second mounting member 28 is illustrated. Additionally, the generally circular cross-sections of the first chamber 32 and of docking portion 30 of second mounting member 28 is illustrated. In other embodiments, first mounting member 26 may have a non-circular outer cross-section and second chamber 34 may have a non-circular inner or outer cross-section.

Figure 7:
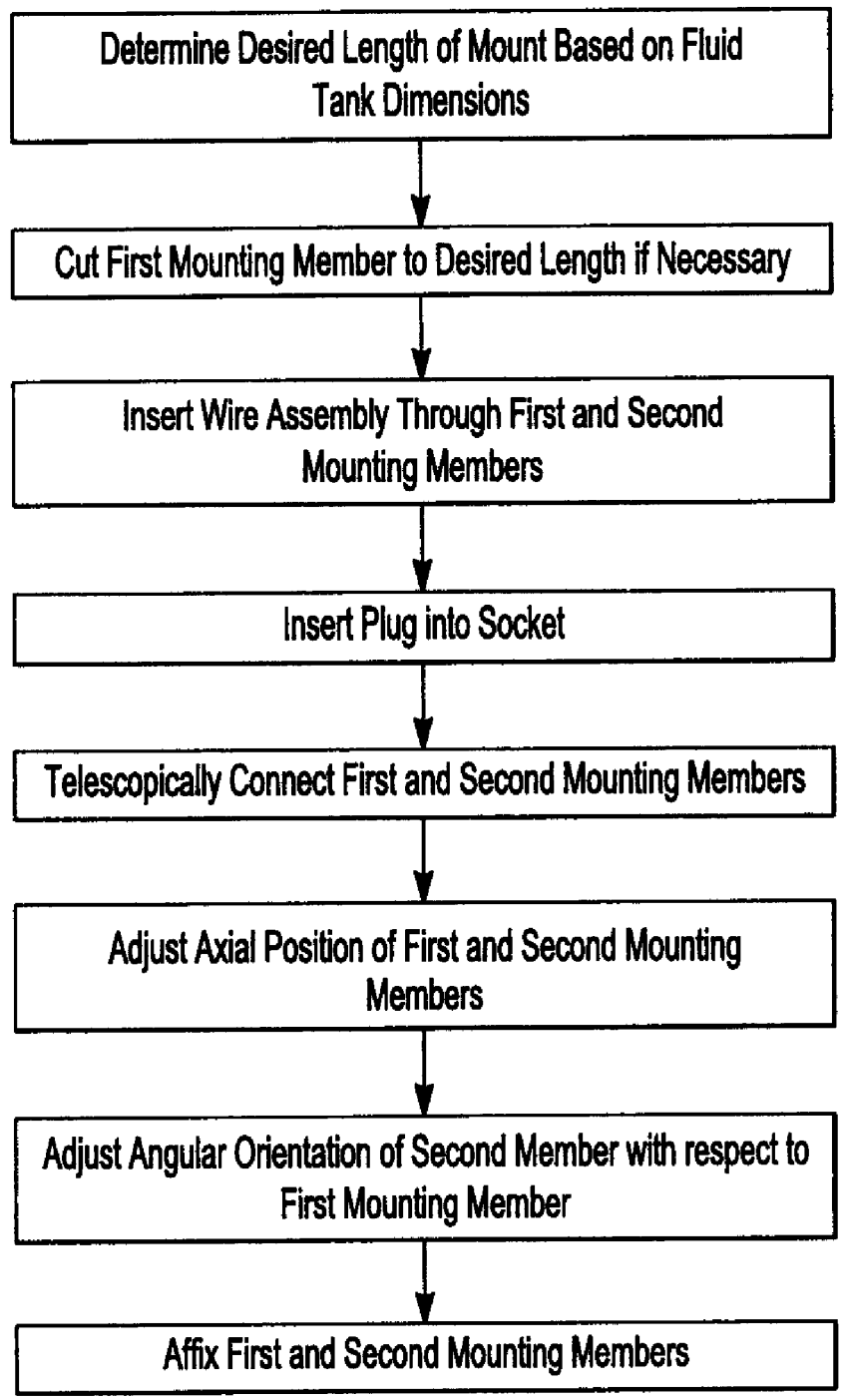
FIG. 7 is a flowchart illustrating an embodiment of a method of the present invention.

FIG. 7 is a flowchart illustrating a method of constructing a fluid level sender assembly 12. In at least one embodiment, the method includes determining the desired length of fluid level sender mount assembly 20 based on the dimensions and configuration of the fluid tank. If necessary, first mounting member 26 may be cut to a desired length. Wire assembly 38 may be threaded through tunnel 35 and electrical terminals 40 may be inserted into socket 42. First and second support members 26, 28 may be telescopically connected in a loose assembly. The first and second mounting members may be axially and angularly adjusted. Once a desired axial and angular position has been attained, the first and second mounting members may be affixed to one another.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fluid level sender mount assembly for mounting a fluid level sender to a fluid container, the assembly comprising:
   a first mounting member having a chamber with a generally circular cross section having a substantially constant diameter along a length of the chamber; and
   a second mounting member having an elongate docking portion having an at least partially circular cross section having a substantially constant diameter along a length of the docking portion, the docking portion being sized to slidably fit and rotate within the chamber to permit the second mounting member to be positioned at a plurality of different linear and angular positions with respect to the first mounting member, the docking portion being disposed within the chamber, the second mounting member being positioned at a desired linear and angular position with respect to the first mounting member, and the second mounting member being affixed to the first mounting member to inhibit relative movement of the first and the second mounting members from the desired linear and angular position,
   one of the first and the second mounting members being adapted to be attached to the fluid container such that a portion of each of the first and the second mounting members projects into the fluid container, and the other of the first and the second mounting members being adapted to be attached to the fluid level sender.

2. The fluid level sender mount assembly of claim 1 wherein the fluid level sender comprises a wire assembly, the chamber is a first chamber that extends throughout the first mounting member, and the second mounting member has a second chamber that is contiguous with the first chamber to form a tunnel for receiving the wire assembly.

3. The fluid level sender mount assembly of claim 2 wherein the second mounting member is adapted to be attached to the fluid level sender, an end of the wire assembly includes an electrical terminal, and the first mounting member includes an electrical connector to receive the electrical terminal and to transmit an electrical signal from the fluid level sender to a receiver positioned outside of the fluid tank.

4. The fluid level sender mount assembly of claim 2 wherein the first mounting member is adapted to be attached to the fluid level sender, an end of the wire assembly includes an electrical terminal, and the second mounting member includes an electrical connector to receive the electrical terminal and to transmit an electrical signal transmitted by the fluid level sender to a receiver positioned outside of the fluid tank.

5. The fluid level sender mount assembly of claim 2 further comprising a mounting plate wherein the first mounting member has a first end and a second end, the docking portion is docked with the first end, the mounting plate is attached to the first mounting member proximate the second end, the mounting plate being adapted to connect the first mounting member to the fluid tank and being configured to permit the wire assembly to pass through the mounting plate.

6. The fluid level sender mount assembly of claim 2 further comprising a mounting plate wherein the first mounting member has a first end and a second end, the docking portion is docked with the first end, the mounting plate is attached to the second mounting member at a position spaced apart from the docking portion, the mounting plate being configured to connect the second mounting member to the fluid tank and to permit the wire assembly to pass through the mounting plate.

7. The fluid level sender mount assembly of claim 1 wherein the second mounting member is affixed to the first mounting member by one of a threaded fastener and a crimp.

8. The fluid level sender mount assembly of claim 1 further comprising a fastener connecting the second mounting member to the first mounting member.

9. A fluid level sender assembly comprising:
   a first mounting member having a first chamber having a generally circular cross section having a substantially constant diameter along a substantial length of the chamber;
   a second mounting member having a docking portion having a generally cylindrical shape and a generally circular cross section having a substantially constant diameter along a length of the docking member, the second mounting member having a second chamber extending through the docking portion, the docking portion being configured to slide telescopically and rotate within the first chamber to allow the second mounting member to be positioned at a plurality of linear and angular positions with respect to the first mounting member, the docking portion being disposed within the first chamber and the second mounting member being positioned at a desired linear and angular position with respect to the first mounting member and the second mounting member being affixed to the first mounting member such that the second mounting member is inhibited from moving with respect to the first mounting member out of the desired angular and linear position; and
   a fluid level sender sub-assembly attached to one of the first and the second mounting members, the other of the first and the second mounting members being adapted for attachment to a fluid tank such that a portion of each of the first and the second mounting members and the fluid level sender sub-assembly are disposed inside of the fluid tank.

10. The fluid level sender assembly of claim 9 wherein the fluid level sender sub-assembly is integral with one of the first and second mounting members.

11. The fluid level sender of claim 9 wherein the fluid level sender comprises a wire assembly and the first and the second chambers form a tunnel to receive at least a portion of the wire assembly.

12. The fluid level sender of claim 11 wherein the fluid level sender is attached to the second mounting member, an end of the wire assembly includes an electrical terminal, and the first mounting member includes a socket to receive the electrical terminal and to transmit an electrical signal from the fluid level sender to a receiver disposed outside of the fluid container.

13. The fluid level sender of claim 11 wherein the fluid level sender is attached to the second mounting member, the first mounting member includes a plate disposed at an end of the first mounting member that is opposite an end attached to the second mounting member, the plate being configured to connect the first mounting member to the fluid tank and being further configured to permit the wire assembly to extend through the plate.

14. The fluid level sender of claim 9 wherein the second mounting member and the first mounting member are attached to one another by a crimp.

15. The fluid level sender of claim 9 further comprising a fastener that affixes the second mounting member to the first mounting member.

16. A method of assembling a fluid level sender assembly having a first support member having first and second ends and a first chamber extending therebetween, a second support member having first and second ends and a second chamber extending therebetween, the second support member being configured for telescopic connection to the first support member and being further configured to rotate with respect to the first support member, and a fluid level sender attached to the second support member, the method comprising:

telescopically connecting the first end of the second support member to the first end of the first support member;

adjusting the axial position of the second support member with respect to the first support member until the fluid level sender is a desired distance rotating the first support member with respect to the second support member until the fluid level sender is at a desired angular orientation with respect to the first support member; and affixing the second support member to the first support member to inhibit further axial and angular movement of the second support member with respect to the first support member.

17. The method of claim 16 wherein the second support member is affixed to the first support member by crimping.

18. The method of claim 16 further comprising cutting the first support member to a desired length.

19. The method of claim 16 further comprising:

determining the desired distance between the fluid level sender and the first end of the support member based on internal dimensions of a fluid tank that is to be fitted with the fluid level sender assembly; and determining the desired angular orientation of the fluid level sender with respect to the first support member based on the internal dimensions of the fluid tank.

20. The method of claim 16, the first support member further having a plate attached proximate the second end of the first support member, the plate being configured for attachment to a fluid tank and having a socket facing the first chamber, the fluid level sender having a wire assembly having an electrical the method further comprising:

inserting the wire assembly through the first and the second connector chambers;

inserting the electrical connector into the socket.

* * * * *

UNITED STATES PATENT AND TRADEMARK OFFICE
CERTIFICATE OF CORRECTION

PATENT NO. : 7,549,333 B1
APPLICATION NO. : 11/961405
DATED : June 23, 2009
INVENTOR(S) : Piet Visser It is certified that error appears in the above-identified patent and that said Letters Patent is hereby corrected as shown below:

Column 10, Line 5, Claim 16:

After "desired distance"

Insert --from the second end of the first support member--.

Column 10, Line 31, Claim 20:

After "electrical"

Insert --connector--.

Signed and Sealed this

First Day of September, 2009

David J. Kappos
*Director of the United States Patent and Trademark Office*